United States Patent [19]
Magee

[11] 4,451,148
[45] May 29, 1984

[54] OPTICAL ANGULAR INTERVAL MARKER

[75] Inventor: Robert J. Magee, Concord, Mass.

[73] Assignee: The Charles Stark Draper Laboratory, Inc., Cambridge, Mass.

[21] Appl. No.: 348,879

[22] Filed: Feb. 16, 1982

[51] Int. Cl.³ .............................................. G01B 11/26
[52] U.S. Cl. .................... 356/138; 350/299; 33/1 PT
[58] Field of Search ............... 356/138, 153, 154, 399, 356/400; 350/299, 486; 250/231 SE; 324/97; 33/1 PT, 1 N

[56] References Cited

U.S. PATENT DOCUMENTS

| | | | |
|---|---|---|---|
| 2,038,914 | 4/1936 | Templeton | 356/138 |
| 2,131,738 | 10/1938 | Hoyt | 356/138 |
| 2,232,177 | 2/1941 | Ide | 356/138 |
| 2,853,915 | 9/1958 | Mitchell | 356/138 |
| 3,518,005 | 6/1970 | Weber | 356/153 |
| 3,531,183 | 9/1970 | Aagard | 350/299 |
| 3,711,188 | 1/1973 | Zehnpfennig | 350/299 |
| 3,966,327 | 6/1966 | Hanson | 324/97 |
| 4,410,269 | 10/1983 | Jeffery | 356/138 |

Primary Examiner—R. A. Rosenberger
Attorney, Agent, or Firm—Weingarten, Schurgin, Gagnebin & Hayes

[57] ABSTRACT

Apparatus for indicating with precision relative rotation in terms of integral numbers of relatively large basic angular intervals and small angular deviations from such intervals. A portion of the apparatus is typically mounted to a rotatable support where it is desired to measure and calibrate, with great precision, the angular position of the support every fixed number of degrees, such as one or ten degrees, and to measure offsets from integral numbers of such basic angular intervals. The apparatus comprises two slightly non-parallel mirror surfaces rotatable with the support and illuminated by an autocollimator. The mirrors provide multiple reflections of the illumination. The angle between the mirrors define the basic angular interval. The number of reflections varies with the number of basic angular intervals of support rotation. At each precise integral number of basic intervals, the illumination will return to a fixed location on the autocollimator viewing screen. The screen is mounted to indicate deviations from the exact multiple of basic intervals.

13 Claims, 2 Drawing Figures

OPTICAL ANGULAR INTERVAL MARKER

FIELD OF THE INVENTION

This invention relates to optical systems and more particularly to optical systems for reading small deviations from relatively large rotations or multiples thereof.

BACKGROUND OF THE INVENTION

Angle indicating rotary elements are used in many applications and include such devices as multi-pole rotary transformers exemplified by inductosyns. It is necessary to be able to check the calibration of such elements quickly and easily at selected angular intervals in their operating range. As the rotary range of such elements increases, the accuracy of most such devices degrades as some function of the size of the angular range, making it difficult to determine with absolute accuracy very large angles. As an example, an autocollimator will have a small range typically defined by the field of view of an optical system, but will have high accuracy within that range, up to 1/100 arc-seconds. A theodolite in contrast with a full 360 degree angular operating range, will have substantially lower absolute accuracy, for example 1 arc-second. The calibration of large angular range rotary elements such as inductosyns to accuracies greater than that of a theodolite becomes a substantial problem because the autocollimator field of view cannot be extended beyond a small fraction of the inductosyns range.

In the past, reference elements, for example, a 36 sided polygon, have been used to calibrate, with high accuracy, rotation angle detectors at discrete locations in their operating range, such as every 10 degrees in the case of a 36 sided polygon. Calibration between these discrete points has not been possible with such devices, however, and their accuracy is limited to the precision of each of many mirror placements. Because of the nature of many rotation detectors, such as inductosyns, reliance cannot be placed upon curve fitting techniques to fill in the range between these points of calibration to give accurate results.

SUMMARY OF THE INVENTION

The present invention includes a system of mirrors, used with an autocollimator or similar high accuracy limited range angle measuring device, and other apparatus to extend the high accuracy, limited range angle measuring ability of the autocollimator to cover a large arc in exact multiples of a single, basic angle which is precisely known. In this manner, the high accuracy autocollimator can be operated to calibrate angles between the discrete steps obtained as multiples of the basic angle.

In particular, two planar mirror surfaces are positioned at a slight angle from parallel on the rotary element to be calibrated. Collimated light from the autocollimator is directed at one of the two mirrors where it is multiply reflected between the two mirror surfaces and ultimately reflected back toward the autocollimator. The originating light beam and the reflected light image are superimposed in the autocollimator revealing an original image and a reflected image offset from the original image by a linear displacement related to the angle of deviation of the rotary element from an exact multiple of the basic angle. The basic angle is determined by the angle between the nearly parallel mirrors. Multiples of the basic angle are defined by the number of multiple reflections. As the rotary element turns, the reflected image will traverse the autocollimator image screen disappearing at one end to return at the other as a result of the light path through the mirrors increasing or decreasing by a discrete number of reflections.

Specifically, the present invention relates to the angular movement of a rotary element about its center of rotation relative to a reference position at which, typically, an autocollimator is located. The surface of a first planar mirror is placed coincident with the center of rotation and a beam of light containing a predetermined hair line or graticule image from the autocollimator is directed to the first mirror at the location of the center of rotation. If the incident light beam is perpendicular to the surface of the first mirror, it is reflected directly back to cause a reflected image to exactly coincide with the incident beam position on the autocollimator image screen. As the first mirror is rotated about the center of rotation through an angle, the reflected image will travel off the image screen. A second mirror is positioned to intercept the reflected image at some predetermined angle and reflect it back toward the first mirror near the center of rotation. When the reflection from the second mirror exactly doubles back upon itself, the position of the reflected image on the image screen will coincide with the original and represent one basic angle of rotation. A range of angles about this basic angle can be determined by the linear offset of the images on the image screen. Multiples of the basic angle are achieved by rotating the mirrors to produce greater numbers of reflections. The basic angle is established by the angle between the mirrors and can be very accurately set against a reference at a large angle where the multiple number of reflections is large.

BRIEF DESCRIPTION OF THE DRAWING

These and other features of the present invention are more fully described in the following, solely exemplary, detailed description and in the accompanying drawing in which.

DETAILED DESCRIPTION OF THE INVENTION

Figure 1:
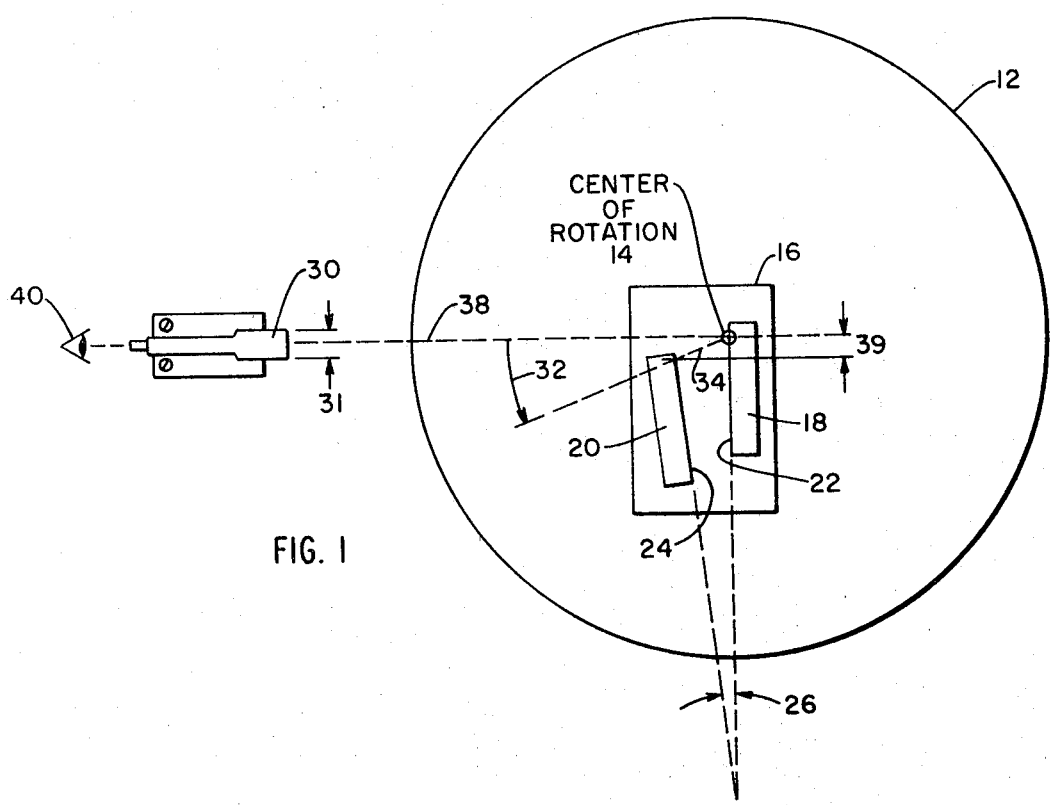
FIG. 1 is a plan view of a calibration system incorporating one embodiment of the present invention.

The preferred embodiment of the present invention as shown in FIG. 1 is an angular calibration system for calibration of optical rotation indicators. A table 12 rotates about a center of rotation 14 and may rotate with an instrument such as a rotary transformer to be calibrated. A mirror assembly 16 located on table 12, contains two planar mirror surfaces 22 and 24 facing each other and formed of a first planar mirror 18 and a second planar mirror 20 respectively. The two mirrors 18 and 20 have their reflecting surfaces placed nearly parallel on the assembly 16 and the center of rotation 14 lies in the plane of the surface 22 of the first mirror 18, toward one end of the mirror 18. The mirror surface 24, while disposed in a nearly parallel position to surface 22, nevertheless, forms a slight predetermined angle 26 thereto.

An autocollimator 30 is positioned apart from table 12 and provides a light beam 38 directed to the region of the surface 22 at the center of rotation 14. The autocollimator 20 may be a Hilger and Watts Model TA53, although other comparable units may also be used. The autocollimator is rigidly mounted off the table 12 and is stationary relative to the rotary motion of table 12, assembly 16 and mirrors 18 and 20 as they are rotated through an angle 32 about the center of rotation 14. The angle 32 is arbitrarily set at zero at the position where the beam 38 projected by the autocollimator 30 onto the surface 22 is exactly perpendicular or normal to that surface, resulting in a reflection exactly coinciding with the original incident beam 38 of the autocollimator 30 and visible in the image screen of the autocollimator as a mark 46 (FIG. 2) coincident with or slightly displaced from a reference line 44.

As the angle 32 increases, the reflected image moves across the image screen in the autocollimator 30. When the angle 32 equals the angle 26, a secondary reflection of the image projected by the autocollimator 30 is again received by the autocollimator and superimposed on the original image in the screen. This results from reflection of the beam 38 from mirror surface 22 along path 34 to the second surface 24. Path 34 is at this point perpendicular to surface 24 causing a reflection back along path 34 to surface 22 and thence back to the autocollimator 30. The image when viewed after passage along path 34 will resemble the image travelling solely along the path of beam 38 with only a slight loss of intensity due to the reflection losses produced by the less than perfect reflectivity of surfaces 22 and 24. When the table 12 is further rotated, increasing the angle 32, the light beam 38 is reflected on additional paths between the surfaces 24 and 22 of mirrors 20 and 28 respectively. At precise integral multiples of angle 26, the light reflected back toward autocollimator 30 from multiple reflections between mirrors 18 and 20 will exactly coincide with the path of beam 38. The image seen by a viewer 40 in the image screen of the autocollimator 30 will show an exact superimposing of the emitted and returned images.

Figure 2:
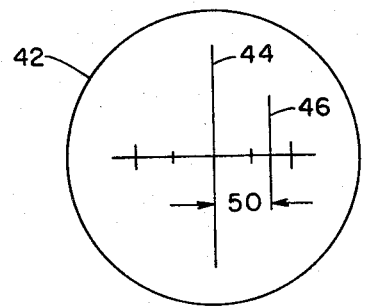
FIG. 2 shows a typical collimator image for the system of FIG. 1.

A typical appearance of the image screen is shown in FIG. 2 as an image 42 having a cross hair graticule 44. Normally the reflected light returning from the mirror surfaces of the angle marker assembly 16 will exactly coincide with the graticule 44 when the rotational angle 32 exactly equals integral multiples of the mirror offset angle 26. When the table 12 rotation angle 32 is offset slightly from the exact integral intervals, a non-overlap of the two images results. In such a case, as shown in FIG. 2, the offset, reflected image 46 lies to the side of the central graticule 44. The reflected image can generally be distinguished from the reference image at graticule 44 as being somewhat less well formed or focused than the original image and it would also have additional identifying characteristics, such as lower intensity and the ability to move relative to the viewing screen of image 42.

The offset indicated by the distance 50 between the images 44 and 46 relates to the deviation of the angle 32 from the closest integral multiple of the angle 26 and can be precisely measured with micrometer controlled motion of the screen as provided for on the autocollimator. There is a linear relationship between the distance 50 and the deviation of the angle 32 from an exact multiple. This linear relationship will remain constant irrespective of the increasing number of reflections between mirrors 18 and 20. In practice, the first three or so integral multiples of the angle 26 fail to produce complete reflection returns because a portion of the reflected beam 34 misses the mirror 20. The best measurement range thus begins above this initial few multiples.

Referring again to FIG. 1, in the preferred embodiment the mirrors 18 and 20 are typically 12 inches in length and have separations at either end of about 10 inches for the lesser separation and up to about 11 inches at the greater separation, depending upon angle 26. It is further significant to note that the autocollimator 30 has a beam width 31 which should not be obstructed by the end of the mirror 20 when the angle 32 is zero. For this reason, the mirror 20 is laterally offset by a distance 39 from the center of the path of beam 38 between the autocollimator 30 and the center of rotation 14 to allow passage of the entire incident and reflected beams 38. This offset is typically one inch for a beam width of one inch. The base angle 26 is typically 0.1°, or greater. Among the other considerations for accuracy of the system, the position of the autocollimator relative to the rotary table 12 must be accurately set with respect to the element, such as an inductosyn, to be calibrated. The sharpness of the viewed images is also important to accurate measurement. Thirdly, the length of the mirrored surfaces is directly related to the number of reflections possible and therefore to the total number of return images or maximum displacement angle 32 measured. In addition, the mounting must be rigid and vibration free to provide a definite image reading. The temperature of the mirrors 18 and 20 is preferably controlled so that the mirrors 18 and 20 will not provide distorted images and reduce the accuracy of the angular measurement. For this purpose they may be placed in a closed environment. The mirrors must also be flat to an appropriate value to maintain a consistent accuracy among the multiplicity of reflections a condition relatively easy to achieve.

It is also anticipated and within the scope of the present invention to use imaging devices of greater refinement than the autocollimator. One such device may include an interferometer wherein the fringe lines may be counted or their rate of passage across the plane of view may be observed.

These and other embodiments according to the present invention are within the scope of the present invention, which is not limited to what has been described except as defined by the appended claims.

What is claimed is:

1. An optical angular interval indicator comprising:
   first and second optically reflecting surfaces generally facing each other and positioned with their reflecting surfaces slightly non-parallel forming a basic angle therebetween;
   means for rotating said first and second reflecting surfaces in a plane generally orthogonal to said first and second reflecting surfaces;
   means for projecting a collimated beam of light toward said first and second reflecting surfaces;
   said rotating means orienting said first and second surfaces relative to said beam of light to permit varying numbers of multiple reflections therebetween and to return the multiply reflected beam of light toward said projecting means at integral multiples of said base angle in the rotation of said first and second reflecting surfaces; and
   means associated with said projecting means for indicating the degree to which said returned beam of light departs from the path of its projection toward said first and second reflecting surfaces.

2. The indicator of claim 1 wherein said first and second optically reflecting surfaces are planar.

3. The indicator of claim 1 wherein the axis of rotation of said rotating means lies in the plane of said first reflecting surface.

4. The indicator of claims 1 or 3 wherein said beam of light is projected toward the axis of rotation of said rotating means.

5. The indicator of claim 1 wherein said basic angle is approximately 0.1 degree.

6. The indicator of claim 1 wherein said basic angle is approximately 1.0 degree.

7. The indicator of claim 1 wherein said first and second reflecting surfaces are separated by several inches.

8. The indicator of claim 7 wherein said separation is approximately 10 inches.

9. The indicator of claim 1 wherein said first and second surfaces extend in a direction orthogonal to the axis of rotation of said rotating means a distance of several inches.

10. The indicator of claim 9 wherein said distance is approximately 10 to 11 inches.

11. The indicator of claim 1 wherein said means for projecting and said means for indicating deviation include an autocollimator.

12. The indicator of claim 11 wherein said autocollimator includes:
   an image screen for permitting viewing of the position of the returned light beam; and
   means for adjusting the relative position of the returned light beam and said image screen.

13. A method of optically detecting integral multiples of a base angle and deviations therefrom comprising the steps of:
   projecting a beam of light onto a first one of first and second reflecting surfaces which are angled to each other by said base angle and rotatable together to produce varying numbers of multiple reflections between said first and second reflecting surfaces and to return said beam of light from said one reflecting surface;
   imaging the returned beam of light on a viewing screen to provide an indication of the deviation of said returned beam of light from coincidence with said projected beam of light; and
   said beam of light returning in coincidence with the projected beam of light at integral multiples of said base angle in the rotation of said reflecting surfaces together.

* * * * *

UNITED STATES PATENT AND TRADEMARK OFFICE
CERTIFICATE OF CORRECTION

PATENT NO. : 4,451,148
DATED : May 29, 1984
INVENTOR(S) : Robert J. Magee

It is certified that error appears in the above—identified patent and that said Letters Patent is hereby corrected as shown below:

Column 3, line 33, "28" should read --18--.

Signed and Sealed this

Thirtieth Day of October 1984

[SEAL]

Attest:

GERALD J. MOSSINGHOFF

*Attesting Officer*     *Commissioner of Patents and Trademarks*